Patented Feb. 26, 1952

2,587,369

UNITED STATES PATENT OFFICE 2,587,369

METHOD OF ADDING EMULSIFYING AGENTS TO PREPARED ICE CREAM MIXES

Nat H. Nash, Bronx County, N. Y., assignor to Lanco Products Corporation, a corporation of New York No Drawing. Application May 11, 1949, Serial No. 92,938

5 Claims. (Cl. 99—136)

The present invention relates to the manufacture of ice cream, sherbet, frozen custard, frozen malted milk and other frozen confections, and more particularly to a new and improved method of adding emulsifying agents to prepared mixes of the above types of products.

The use of emulsifying agents in ice cream and other frozen confections is recognized as giving various advantages, among them being speeding up of the whipping time, shortening of the time required to obtain a predetermined overrun, elimination of the necessity of ageing the ice cream product, production of a smoother texture, lessened tendency to iciness and retarded growth of the ice crystals present.

The emulsifying agents employed in ice cream mixes and mixes for other frozen confections as they are generally produced at the present time usually consist of or comprise esters of the higher fatty acids and polyhydric alcohols. The following are a few examples of the esters that are used for this purpose; glyceryl monostearate, propylene glycol monostearate, glyceryl distearate, polyoxyethylene stearate (with varying lengths of the polyoxyethylene chain), polyoxyethylene palmitate, higher fatty acid esters of sorbitol, sorbitan and other alcohols produced from sugars by reduction, e. g. sorbitan monostearate, and the ethylene oxide derivatives of such fatty acid esters. Certain hydrophilic triglycerides of the higher fatty acids may also be employed.

The term "higher fatty acid" as used herein and in the appended claims is intended to include the fatty acids that are found in the various edible animal and vegetable fats such as butter, cocoanut oil, cottonseed oil, peanut oil, lard and beef and mutton fats.

It has been customary in using emulsifying agents in improving the qualities of ice cream and other frozen confections to add the emulsifying agent to the ice cream mix at the time the other ingredients, such as milk, cream and sugar, are brought together and before the mix is pasteurized. The mix is then homogenized, cooled and stored.

There are, however, many ice cream and other frozen confection manufacturers who do not manufacture their own mix for freezing and whipping but who purchase the prepared mix from other processers. In many cases these prepared mixes do not contain an emulsifying agent because they are made for distribution to various ice cream makers some of whom may not wish an emulsifying agent present.

The addition of any of these emulsifying agents to the prepared mix presents many problems not encountered when the agent is added prior to or at the time of pasteurization. The prepared mix is poured into the freezer at a temperature of 35–40° F. The majority of the higher fatty acid esters that are suitable for use as emulsifying agents are solid or semi-solid at room temperature and hard at 35–40° F. The few that remain liquid at these temperatures are very viscous and difficult to incorporate into a cold mix. Consequently, uneven distribution in the mix will result. I have found that if it be attempted to overcome the drawback of nonuniform distribution by increasing the proportion of the emulsifying agent added directly at the freezer it will require in many cases as much as four times the amount of the agent to insure the same degree of emulsification as may be obtained when the addition is made at the time the mix is originally prepared and processed. This not only results in needless waste of material and additional cost but also tends to give rise to a strong undesirable flavor in many cases.

The ice cream maker who purchases prepared ice cream mix is usually not equipped with facilities to reheat the mix and subject the prepared mix to a further homogenizing treatment during which the emulsifying agent might be added, and, moreover, reheating of the mix is usually to be avoided as not conducive to retention of the desirable properties that have been acquired by the mix in the course of its previous freezing and storing. Besides such a further treatment would be expensive and would nullify the economic advantages of being able to procure the mix already prepared and ready for freezing.

It is a primary object of the present invention to provide a method whereby it is made possible to add the emulsifying agents to the cold mix at the freezer and in the optimum amount to obtain the desired emulsification.

I have found that the problem may be solved by dissolving the esters in appropriate solvents and then after suitably diluting the solution adding it to the mix immediately before or at the time the mix is poured into the freezer. The solvent employed must be neutral in flavor and nontoxic, and for economic reasons should be cheap. Examples of solvents that may be used in introducing the fat-soluble esters are cottonseed oil, corn oil, peanut oil and soya oil. The water soluble esters may be added in the form of their aqueous solutions. The degree of dilution of the solution has to be considered because too much solvent will result in undesired dilution of the mix. On the other hand too concentrated a solution cannot be used because it will result in insolubility and hardening of the esters by the cold mix before they become uniformly distributed and emulsified with the other components of the mix. Also, most of the esters under consideration will not give a clear, thin flowing solution at too high a concentration.

I have found that the water soluble esters give excellent results when they are introduced in the form of aqueous solutions containing 20 to 30 parts of the ester to each 100 parts of solution, by weight, and when the amount of the ester so introduced is very close to the amount ordinarily employed when the ester is added at the pasteurization stage. It is also noted that the solvents in many cases appear to improve the dispersion and resultant emulsifying action of the ester and consequently make it possible to reduce the amount needed to obtain the desired result. Other non-toxic solvents such as alcohol, propylene glycol and glycerine may also be used with the water soluble esters as well as with other esters that are soluble or miscible therein.

I have found, for example, that a solution of 25 parts of polyoxyethylene sorbitan monostearate in 75 parts of water, both by weight, will give very satisfactory results when added to a prepared ice cream mix at the freezer in the proportion of 6 parts of the ester solution to 1000 parts of the prepared mix.

Other examples, using various solvents and esters are given below:

Example 2

| | | |
|---|---|---|
| Polyoxyethylene stearate | parts | 25 |
| Water | do | 75 |

Example 3

| | | |
|---|---|---|
| Sorbitan trioleate | parts | 25 |
| Cottonseed oil | do | 75 |

Example 4

| | | |
|---|---|---|
| Polyoxyethylene sorbitan monoleate | parts | 25 |
| Ethyl alcohol | do | 75 |

Example 5

| | | |
|---|---|---|
| Polyoxyethylene sorbitan monoleate | parts | 25 |
| Propylene glycol | do | 75 |

In the aforesaid examples the proportions are indicated in parts by weight. The various examples set forth above give satisfactory results when added to prepared mixes of ice cream and other frozen confections of the types herein indicated in such amounts as to insure that the proportion of the ester introduced into the mix is within the range .1 to .2% by weight calculated on the weight of the prepared mix. The invention is not to be deemed as limited otherwise than as indicated by the appended claims.

I claim:

1. The method of emulsifying prepared mixes for ice cream and other frozen confections which comprises adding to the prepared mix, after the pasteurization stage and while the mix is cold, a solution of an emulsifying agent consisting essentially of an ester of a higher fatty acid and a polyhydric alcohol, such solution containing 20% to 30% of said ester dissolved in a non-toxic solvent therefor and the proportion of the ester to the prepared mix being within the range .1 to .2% by weight.

2. The method of emulsifying prepared mixes for ice cream and other frozen confections which comprises adding to the prepared mix, after the pasteurization stage and while the mix is cold, a 20-30% aqueous solution of an ester of a higher fatty acid and a polyhydric alcohol having emulsifying properties, the proportion of the ester to the prepared mix so added being within the range .1 to .2% by weight.

3. The method of emulsifying prepared mixes for ice cream and other frozen confections which comprises adding to the prepared mix, after the pasteurization stage and while the mix is cold, a 25% aqueous solution of polyoxyethylene sorbitan monostearate, the proportion of the monostearate to the prepared mix so added being within the range .1 to .2% by weight.

4. The method of emulsifying prepared mixes for ice cream and other frozen confections which comprises adding to the prepared mix, after the pasteurization stage and while the mix is cold, a solution of 25 parts of polyoxyethylene sorbitan monoleate in 75 parts of ethyl alcohol, both by weight, the proportion of the monoleate to the prepared mix so added being within the range .1 to .2% by weight.

5. The method of emulsifying prepared mixes for ice cream and other frozen confections which comprises adding to the prepared mix, after the pasteurization stage and while the mix is cold, a solution of 25 parts of sorbitan trioleate in 75 parts of cottonseed oil, both by weight, the proportion of the trioleate to the prepared mix so added being within the range .1 to .2% by weight.

NAT H. NASH.

REFERENCES CITED

The following references are of record in the file of this patent:

UNITED STATES PATENTS

| Number | Name | Date |
|---|---|---|
| 2,398,950 | Moore | Apr. 23, 1946 |
| 2,474,019 | Steiner et al. | June 21, 1949 |
| 2,493,324 | Steiner et al. | Jan. 3, 1950 |

OTHER REFERENCES

"Atlas Spans and Atlas Tweens," reprinted June 1945 by Atlas Powder Co., Wilmington, Delaware, pages 1, 2, 11, 16.